United States Patent
Bucourt et al.

[11] 3,719,691
[45] March 6, 1973

[54] 7α-METHYL-13β-ALKYL-17α-HYDROCARBYL-17β-OXY-Δ4,9,11-GONATRENE-3-ONES

[75] Inventors: Robert Bucourt; Lucien Nedelec, both of Clichy-sous-Bois; Jean-Claude Gasc, Bondy, all of France

[73] Assignee: Roussel Uclaf, Paris, France

[22] Filed: July 27, 1970

[21] Appl. No.: 58,666

[30] Foreign Application Priority Data

July 28, 1969 France..................................6925700

[52] U.S. Cl.......260/397.45, 260/239.55 C, 260/999
[51] Int. Cl.............................................C07c 167/14
[58] Field of Search ......./Machine Searched Steroids

[56] References Cited

UNITED STATES PATENTS

| | | | |
|---|---|---|---|
| 3,282,785 | 11/1966 | Joly et al. | 167/65 |
| 3,453,267 | 7/1969 | Vignau et al. | 260/239.55 |
| 3,461,118 | 8/1969 | Edwards | 260/239.55 |
| 3,472,884 | 10/1969 | Bertin et al. | 260/397.45 |

Primary Examiner—Henry A. French
Attorney—Hammond & Littell

[57] ABSTRACT

A novel process for the preparation of 7α-methyl-13β-R-17α-X-17β-OY-Δ$^{4,9,11}$-gonatriene-3-ones of the formula

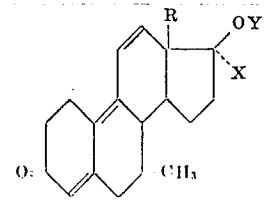

wherein R is lower alkyl of one to four carbon atoms, X is saturated or unsaturated, substituted or unsubstituted, straight or branched aliphatic hydrocarbon of one to four carbon atoms and Y is selected from the group consisting of hydrogen and acyl of an organic carboxylic acid of one to 18 carbon atoms and novel intermediates formed therein.

4 Claims, No Drawings

7α-METHYL-13β-ALKYL-17α-HYDROCARBYL-17β-OXY-Δ4,9,11-GONATRENE-3-ONES

OBJECTS OF THE INVENTION

It is an object of the invention to provide a novel process for the preparation of the $\Delta^{4,9,11}$-gonatriene of Formula I.

It is another object of the invention to provide novel intermediates produced in the process of the invention.

These and other objects and advantages of the invention will become obvious from the following described description.

THE INVENTION

The novel process of the invention for the preparation of 7α-methyl-$\Delta^{4,9,11}$-gonatrienes of the formula

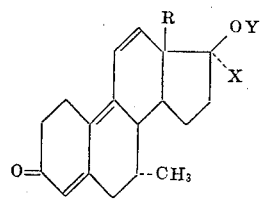

I wherein R is loweralkyl of one to four carbon atoms, X is saturated or unsaturated, substituted or unsubstituted, straight or branched aliphatic hydrocarbon of one to four carbon atoms and Y is selected from the group consisting of hydrogen and acyl of an organic carboxylic acid of one to 18 carbon atoms comprises reacting a 7α-methyl-Δ4-gonene of the formula

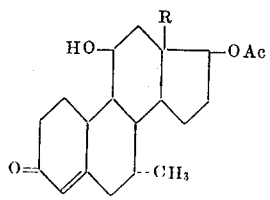

II wherein R has the above definition and Ac is acyl of an organic carboxylic acid with a dehydrating agent to form a mixture of dehydrated products, reacting the said mixture in acid media with a ketalization agent capable of forming a cyclic ketal to form a compound of the formula

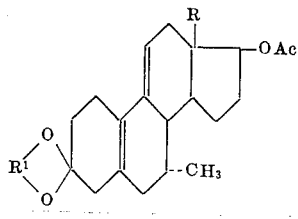

III wherein R¹ is an alkylene, saponifying the latter with a basic agent to form a compound of the formula

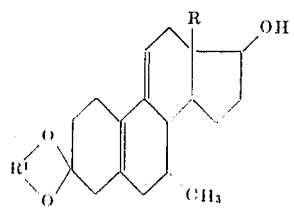

IV subjecting the latter to the action of an oxidizing agent to form a compound of the formula

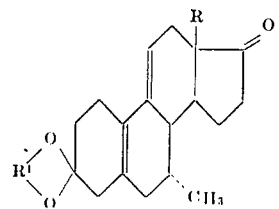

V reacting the latter with an organic metallic derivative to obtain a compound of the formula

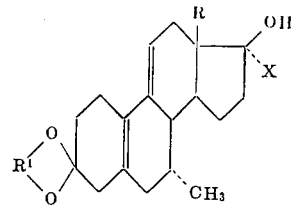

VI where X has the above definition, esterifying, if desired, the said compound to form the corresponding 17β-OY compound hydrolyzing the latter compound in an acidic media to form a compound of the formula

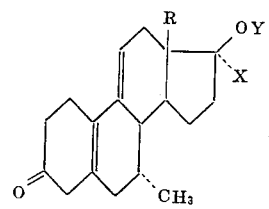

VII oxidizing the latter with oxygen in the presence of a tertiaryamine to form a compound of the formula

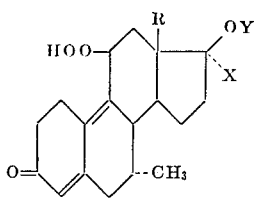

VIII subjecting the latter to the action of a reducing agent to form a compound of the formula

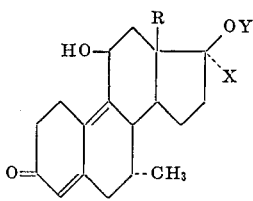

IX reacting the latter with an acid in an aprotic solvent in the presence of a nucleophilic agent to obtain a 7α-methyl-$\Delta^{4,9,11}$-gonatriene of formula I.

The process of the invention is useful for the preparation of the family of 7α-methyl-13β-alkyl-$\Delta^{4,9,11}$-gonatrienes of formula I. R is preferably methyl, ethyl, propyl, isopropyl, butyl or sec. butyl. X is preferably selected from the group consisting of methyl, ethyl, propyl, isopropyl, ethynyl, vinyl, allyl, propene-1-yl, chloroethynyl and 2-methyl-propene-2-yl.

Examples of suitable organic acids of one to 18 carbon atoms may be derived from an aliphatic, aromatic, cyclo-aliphatic or heterocyclic carboxylic acid. Examples of suitable acids are alkanoic acids, such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelargonic acid, capric acid, undecyclic acid, lauric acid, myristic acid, palmitic acid and stearic acid; alkenoic acids, such as undecylenic acid and oleic acid; cycloalkyl carboxylic acids, such as cyclopentyl carboxylic acid, cyclopropyl carboxylic acid, cyclobutyl carboxylic acid and cyclohexyl carboxylic acid; cycloalkyl alkanoic acids, such as cyclopentyl acetic acid, cyclohexyl acetic acid, cyclopentyl propionic acid and cyclohexyl propionic acid; arylalkanoic acids, such as phenyl acetic acid and phenyl propionic acid; aryl carboxylic acids, such as benzoic acid and 2, 4-dinitrobenzoic acid; phenoxy alkanoic acids such as phenoxy acetic acid, p-chlorphenoxy acetic acid, 2,4-dichlorophenoxy acetic acid, 4-ter-butylphenoxy acetic acid, 3-phenoxy propionic acid and 4-phenoxy butyric acid; heterocyclic carboxylic acids, such as furane-2-carboxylic acid, 5-terbutylfurane-2-carboxylic acid, 5-bromo-furane-2-carboxylic acid and nicotinic acids; β-ketoalkanoic acids, such as acetylacetic acid, propionylacetic acid and butyrylacetic acid; amino acids, such as diethylaminoacetic acid and aspartic acid.

The compounds of Formula I possess interesting endocrinic properties which may be used as anabolic agents for the treatment of thinness or osteoporose or an androgenic agent for the treatment of adiposo genitious syndromes, or as a progestative agent for the treatment of sterility or repeated abortions or as hypophysial inhibitory agents for arresting ovaries or treatment of sexual hypersecretions.

Examples of specific compounds of formula I are 7α, 17α-dimethyl-13ds-ethyl-Δ$^{4,9,11}$-gonatriene-17β-ol-3-one, 7α, 17α-dimethyl-13β-ethyl-17β-acetoxy-Δ$^{4,9,11}$-gonatriene-3-one, 7α, 17α-dimethyl-13βethyl-17β-propionyloxy-Δ$^{4,9,11}$-gonatriene-3-one, 7α, 17α-dimethyl-13β-ethyl-17β-benzoxyloxy-Δ$^{4,9,11}$-gonatriene-3-one, 7α, 17α-dimethyl-13β-propyl-Δ$^{4,9,11}$-gonatriene-17βo1-3-one, 7α, 17α-dimethyl-13β-propyl-17β-benzoyloxy-Δ$^{4,9,11}$-gonatriene-3-one, 7α-methyl-13β-ethyl-17α-ethynyl-Δ$^{4,9,11}$-gonatriene-17βo1-3-one, 7α-methyl-13β-ethyl-17α-(2-methyl-propene-2-yl)-Δ$^{4,9,11}$-gonotriene-17β-o1-3-one, 7α-methyl-13β-ethyl-17α-allyl-Δ$^{4,9,11}$-gonatriene-17β-o1-3-one, 7α-methyl-13β-ethyl-17α-chloroethynyl-Δ$^{4,9,11}$-gonatriene-17β-ob-3-one, 7α-methyl-13β-ethyl-17α-vinyl-Δ$^{4,9,11}$-gonatriene-17β-o1-3-one, 7α-methyl-13β-propyl-17α-ethynyl-Δ$^{4,9,11}$-gonatriene-17β-o1-one, 7α-methyl-13β-propyl-17αvinyl-Δ$^{4,9,11}$-gonatriene-17β-o1-3-one and 7α17α-dimethyl-13β-propyl-17β-acetoxy-Δ$^{4,9,11}$-gonatriene-3-one.

One of the characteristics of the invention are the novel intermediates of the formula

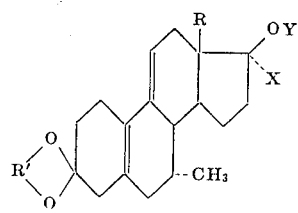

wherein R, R', X and Y have the above definitions. The said gonadienes have an industrial interest as being intermediates from which the gonatrienes of formula I are easily accessible and the said gonatrienes have a well-known considerable physiological activity.

Examples of novel intermediates of formula Va are 3,3-ethylenedioxy-7α, 17α-dimethyl-17β-acetoxy-Δ$^{5(10),9(11)B}$-estratriene, 3,3-ethylendioxy-7α, 17α-dimethyl-,7β-propionoyloxy-Δ$^{5(10),9(11)}$-estradiene, 3,3-ethylenedioxy-7α, 17α-dimethyl-17β-benzoyloxy-Δ$^{5(10),9(11)B}$-estradiene, 3,3-ethylenedixoy-7α, 17α-dimethyl-13β-ethyl-Δ$^{5(10),9(11)}$ gonadiene-17β-ol, 3,3-ethylenedioxy-7α, 17α-dimethyl-13βethyl-17β-acetoxy-Δ$^{5(10),9(11)}$-gonadiene, 3, 3-ethylenedioxy-7α, 17α-dimethyl-13β-ethyl-17β-propionyloxy-Δ$^{5(10),9(11)}$-gonadiene, 3, 3-ethylenedioxy-7α, 17α-dimethyl-17β benzoyloxy-Δ$^{5(10),9(11)}$-gonadiene, 3, 3-ethylenedioxy-7α, 17α-dimethyl-13β-propyl-Δ$^{5(10),9(11)}$-gonadiene-17β-o1, 3, 3-ethylenedioxy-7α, 17α-dimethyl-13β-propyl-17βacetoxy-Δ$^{5(10),9(11)}$-gonadiene, 3,3-ethylenedioxy-7α, 17α-dimethyl-13β-propyl-17β-benzoyloxy-Δ$^{5(10),9(11)}$-gonadiene, 3, 3-ethylenedioxy-7α-methyl-17α-ethynyl-Δ$^{5(10),9(11)}$-estradiene-17β-o1, 3,3-ethylenedioxy-7α-methyl-17α-(2-methyl-propene-2-yl)-Δ$^{5(10),9(11)}$-estradiene-17β-o1, 3, 3-ethylenedioxy-7α-methyl-17α-allyl-Δ$^{5(10),9(11)}$-estradiene-17β-o1, 3, 3-ethylenedioxy-7α-methyl-17α-chloroethynyl-Δ$^{5(10),9(11)}$-estradiene-17β-o1, 3, 3-ethylenedioxy-7α-methyl-17α-vinyl-Δ$^{5(10),9(11)}$-gonadiene-17β-o1, 3, 3-ethylenedioxy-7α-methyl-13β-ethyl-17α-ethynyl-Δ$^{5(10),9(11)}$-gonadiene-17β-o1, 3, 3-ethylenedioxy-7β-methyl-13β-ethyl-17α-(2-methyl-propene-2-yl)-Δ$^{5(10),9(11)}$-gonadiene-17β-o1, 3, 3-ethylenedioxy-7α-methyl-13β-ethyl-17αallyl-Δ$^{5(10),9(11)B}$-gonadiene-17β-ol, 3, 3-ethylenedioxy-7α-methyl-13β-ethyl-17α-vinyl-Δ$^{5(10),9(11)}$-gonadiene-17β-ol, 3,3-ethylenedioxy-7α-methyl-13β-ethyl-17α-chloroethynyl-Δ$^{5(10),9(11)}$-gonadiene-17β-o1,3,3-ethylenedioxy-7α-methyl-13β-propyl-17α-ethynyl-Δ$^{5(10),9(11)}$-gonadiene-17β-o1, 3,3-ethylenedioxy-7α-methyl 13β-propyl-17αvinyl-Δ$^{5(10),9(11)}$-gonadiene-17β-o1 and 3,3-ethylenedioxy-7α, 17α -dimethyl-Δ$^{5(10),9(11)}$-estradiene-17β-o1.

For the process of the invention, the dehydrating agent is preferably N-bromo-acetamide in the presence of sulfurous acid anhydride although one may use phosphorus oxychloride or thionyl chloride in the presence of pyridine and the resulting dehydration product is a mixture and of diverse dienic compounds characterized by infrared and ultraviolet spectra whose double bonds may be conjugated [5(10),9(11) or 4,9] or non-conjugated [4,9(11) or 4,11]. The action of the ketalization agent with this mixture leads principally to the 3 ketal of 7α-methyl-13β-R-17β-acyloxy-Δ$^{5(10),9(11)}$-gonadiene-3-one. The ketalization agent is preferably ethylene glycol or 2-methyl-2-ethyl-dioxolane. Ethylene glycol in the presence of pyridine hydrochloride is most preferred.

The basic agent to saponify the 17α acyloxy function of the compound of formula III is preferably an alkali metal hydroxide such as potassium hydroxide and the saponification is effected in an alcohol such as methanol. The oxidation of the 17β-OH group of the compound of formula IV is effected by the Oppenauer reaction using a lower aliphatic ketone such as acetone, methyl ethyl ketone, methyl iso butyl ketone or a cyclic ketone such as cyclo hexanone in the presence of an aluminum secondary alcoholate such as aluminum isopropylate.

The introduction of the 17α substituent may be realized with an organometallic compound of organo lithium type XLi or of XMgHal type where Hal is a halogen such as chlorine or bromine. The esterification of the 17β-OH group of a compound of formula V may be effected with the usual esterification agents such as the free acids, acid anhydride or acid chloride. The acid hydrolysis of the 3-ketal group may be an organic acid such as citric acid or acetic acid. The hydrolysis is advantageously effected in the presence of several solvents such as alcohols, i.e. ethanol or methanol or a hydrocarbon such as benzene or toluene.

The peroxide formation is effected with oxygen in the presence of a tertiary amine, preferably triethylamine or pyridine and in an organic solvent such as methanol, ethanol or a N, N-dialkylamide such as dimethyl formamide. The reduction of the hydroperoxy group is preferably effected with triethyl phosphite, trimethyl phosphite or an alkali metal iodide such as potassium iodide.

The acid used to form the $\Delta^{4,9,11}$-gonadiene is preferably a strong mineral acid such as perchloric acid or sulfuric acid or an organic acid such as formic acid on p-toluene sulfonic acid or a Lewis acid such as boron trifluoride. The nucleophilic agent is preferably an organic acid nitrile such as acetonitrile, malonic dinitrile, dichloroacetonitrile, etc. or an alkali metal cyanide such as sodium cyanide or potassium cyanide. The aprotic solvent may be methylene chloride, chloroform, cyclohexane, benzene, ethyl ether or tetrahydrofuran.

The starting 7α-methyl-13β-R-17β-acyloxy-$\Delta^4$ gonene -11β-ol-3-one of formula II can be prepared by the process of commonly assigned U. S. patent application Ser. No. (58,668) filed on even date herewith which process comprises reacting a 13β-R-$\Delta^4$-gonene-11β, 17β-diol-3-one (prepared by process of French patent No. 1,574,693) with an acylating agent or a mixture of acylating agents to obtain the corresponding 3,11β, 17α-triaycloxy-13β-R -$\Delta^{3,5}$-gonadiene, reacting the latter with an appropriate brominating agent to selectively brominate in the six-position, dehydrobrominating the latter with a lithium halide in the presence of a basic agent to obtain 11β, 17α-diacyloxy-13β-R-$\Delta^{4,6}$-gonadiene-3-one, reacting the latter with an organo metallic agent containing a methyl group, preferably in the presence of a catalyst such as cuprous chloride then saponifying with a base the incompletely cleaved esters to obtain 7α-methyl-13β-R-$\Delta^4$-gonene-11β, 17β-diol-3-one which is acylated in the 17 position by known methods.

In the following examples there are described several preferred embodiments to illustrate the invention. However, it should be understood that the invention is not intended to be limited to the specific embodiments.

EXAMPLE

Preparation of 7α, 17α-dimethyl-13β-ethyl-$\Delta^{4,9,11}$-gonatriene-17β-ol--o3-one STEP A: 3,3-ethylenedioxy-7α-methyl-13β-ethyl-17β-acetoxy-$\Delta^{5(10),9(11)}$-gonadiene 19.4 gm of 7α-methyl-13β-ethyl-17β-acetoxy-$\Delta^4$gonene-11β-ol-3-one [prepared as in copending, commonly assigned U. S. patent application Ser. No. 58,668 filed on even date herewith] were dissolved in 240 cc of pyridine under a nitrogen atmosphere and after the addition of 11 gm of N-bromo-acetamide, the mixture was stored at room temperature for 15 minutes. The mixture was cooled to 0°C. and sulfurous dioxide was bubbled through the reaction mixture until a amido-iodide paper test was negative. The reaction mixture was added to ice-water mixture and the aqueous phase was extracted with methylene chloride. The methylene chloride extracts were washed with an aqueous hydrochloric acid solution, with water, were dried and concentrated to dryness to obtain 18.7 gm of a raw dehydrated mixture.

The said 18.7 gm of raw product were dissolved under a nitrogen atmosphere in a mixture of 945 cc of chloroform and 94.5 cc of ethylene glycol and 18.7 gm of the hydrochloric salt of pyridine were added thereto. The reaction mixture was refluxed for 18 hours and after cooling was added to a water-ice mixture. The aqueous phase was extracted with methylene chloride and the methylene chloride extracts were washed with a saturated aqueous sodium bicarbonate solution, were dried and concentrated to dryness. The residue was empasted with a 1-1 mixture of iso propyl ether and petroleum ether (b.p.=35°–70°C) to obtain 11.69 gm of 3,3-ethylenedioxy-7α-methyl-13β-ethyl-17β-acetoxy-$\Delta^{5(10),9(11)}$-gonadiene melting at 151°C.

U. V. Spectrum (ethanol):

Max. at 236–237 mμ     ∈=17,900
Max. at 243 mμ     ∈=19,400
Inflexion towards 250 mμ     ∈=13,000

By chromatography over silica gel of the empasting mother liquors and elution with a 1-1 mixture of ethyl ether and petroleum ether (Bp=35°–70°C.), a second crop of 3.19 gm of 3,3-ethylenedioxy-7α-methyl-13β-ethyl-17β-acetoxy-$\Delta^{5(10),9(11)}$ gonadiene melting at 150°C. were obtained.

As far as is known, the latter product is not described in the literature.

STEP B: 3,3-ethylenedioxy-7α-methyl-13β-ethyl-$\Delta^{5(10),9(11)}$-gonadiene-17β-ol 14.8 gm of 3,3-ethylenedioxy-7α-methyl-13β-ethyl-17β-acetoxy-$\Delta^{5(10),9(11)}$-gonadiene were added under a nitrogen atmosphere to a mixture of 148 cc of methanol and 14.8 cc. of a 50°Be' aqueous potassium hydroxide solution and the mixture was heated to reflux and held there for 30 minutes. After cooling, the mixture was poured into a water-ice mixture and stirred. The precipitate formed was recovered by vacuum filtration, was washed and dried to obtain 12.8 gm of 3,3-ethylenedioxy-7α-methyl-13β-ethyl-$\Delta^{5(10),9(11)}$-gonadiene-17β-ol melting at 148°C.

U.V. Spectrum (ethanol):

Max at 237 mμ     ∈=18,000
Max at 244 mμ     ∈=19,400
Max at 252 mμ     ∈=12,550

As far as is known, this compound is not described in the literature.

STEP C: 3,3-ethylenedioxy-7α-methyl-13β-ethyl-$\Delta^{5(10),9(11)}$gonadiene-17 -one.

10 gm of 3,3 ethylenedioxy-7α-methyl-13β-ethyl-Δ$^{5(10),9(11)}$-gonadiene-17β-ol was added under a nitrogen atmosphere to a mixture of 250 cc of toluene and 50 cc of cyclohexanone and the mixture was refluxed to eliminate by distillation 50 cc of toluene. A solution of 5 gm of aluminum isopropylate in 250 cc of toluene was added thereto while continuing distillation to keep a constant reaction volume. Then, a solution of 2.5 gm of aluminum isopropylate in 125 cc of toluene and then a solution of 50 gm of potassium and sodium tartrate in 300 cc of water were added thereto. The solvent was removed by intrainment as a vapor and ice was then added and the mixture was stirred. The aqueous phase was extracted with ethyl ether and the ether extracts were washed with water, were dried and concentrated to dryness under reduced pressure. The residue was purified by chromatography over silica gel with elution with a 3–1 mixture of ethyl ether-petroleum ether (BP=35°70°C.) The homogenous fractions were crystallized from isopropyl ether to obtain 7.73 gm of 3,3-ethylenedioxy-7α-methyl-13β-ethyl-Δ$^{5(10),9(11)}$-gonadiene-17-one-melting at 101°C.
U. V. Spectrum (ethanol):

| | |
|---|---|
| Inflex. towards 231 mμ | ϵ=18,500 |
| Max. at 243–244 mμ | ϵ=19,600 |
| Inflex. towards 251 mμ | ϵ=12,600 |

As far as is known, this compound is not described in the literature.

STEP D: 3,3-ethylenedioxy-7α, 17α-dimethyl-13β-ethyl-Δ$^{5(10),9(11)}$-gonadiene-17β-ol 7.65 gm of 3,3-ethylenedioxy-7α-methyl-13β-ethyl-Δ$^{5(10),9(11)}$-gonadiene-17-one were dissolved under a nitrogen atmosphere in 115 cc of ethyl ether and while cooling the solution to 5°C., 276 cc of a 0.65 M ether solution of methyl lithium were added. The mixture was stirred for 3 hours at 5°C. and was then poured into a mixture of water, ice and ammonium chloride. The ether phase was decanted off and the aqueous phase was extracted with ethyl ether. The combined ether phases were washed with water, dried and concentrated to dryness. The residue was purified by chromatography over silica gel to obtain 5.62 gm of 3,3-ethylenedioxy-7α, 17α-dimethyl-13β-ethyl-Δ$^{5(10),9(11)}$-gonadiene-17β-ol melting at 128°C.
U. V. Spectrum (ethanol):

| | |
|---|---|
| Max. at 236–237 mμ | ϵ=19,000 |
| Max. at 244–245 mμ | ϵ=20,400 |
| Inflex. towards 251–252 mμ | ϵ=13,300 |

As far as is known, this compound is not described in the literature.

STEP E: 7α, 17α-dimethyl-13β-ethyl-Δ$^{5(10),9(11)}$-gonadiene-17β-ol-3-one 5.55 gm of 3,3-ethylenedioxy-7α, 17α-dimethyl-13β-ethyl-Δ$^{5(10),9(11)}$-gonadiene-17β-ol were added to 278 cc of 75 percent aqueous acetic acid and the mixture was stirred at room temperature for 5½ hours. The reaction mixture was poured into a water-ice mixture and the aqueous phase was extracted with methylene chloride. The methylene chloride extracts were washed with an aqueous sodium bicarbonate solution, then with water, dried and evaporated to dryness to obtain 5.07 gm of raw 7α, 17α-dimethyl-13β-ethyl-Δ$^{5(10),9(11)}$-gonadiene-17-β-ol-3-one which was used as is for the next step.

As far as is known, this compound is not described in the literature.

STEP F: 7α, 17α-dimethyl-11β-hydroperoxy-13β-ethyl-Δ$^{4,9}$-gonadiene-17β-ol-3-one 5.07 gm of raw 7α, 17α-dimethyl-13β-ethyl-Δ$^{5(10),9(11)}$-gonadiene-17β-ol-3-one were dissolved in 126 cc of ethanol containing 1 percent of triethylamine and oxygen was bubbled through the solution for 8 hours. The reaction mixture was concentrated to dryness under reduced pressure to obtain 6 gm of raw 7α, 17α-dimethyl-11β-hydroperoxy-13β-ethyl-Δ$^{4,9}$-gonadiene-17β-ol-3-one which was used for the next step as is.

As far as is known, this compound is not described in the literature.

STEP G: 7α, 17α-dimethyl-13β-ethyl-Δ$^{4,9}$-gonadiene-11β,17β-diol-3-one 6 gm of the raw hydroperoxide obtained in Step F were dissolved in 53.5 cc of ethanol and after the addition of 4 cc of triethylphosphite solution thereto, the mixture was refluxed 90 minutes. After cooling, excess phosphite was destroyed by the addition of an aqueous oxygenated water solution and the reaction mixture was poured into a water-ice mixture. The aqueous phase was extracted with ethyl ether and ether extracts were washed with water, dried and concentrated to dryness. The residue was purified by chromatography over silica gel and elution with a 7–3 mixture of chloroform and acetone and the fraction obtained was crystallized from a 8–2 mixture of isopropyl ether-methanol to obtain 1.650 gm of 7α, 17α-dimethyl-13β-ethyl-Δ$^{4,9}$-gonadiene-11β, 17β-diol-3-one melting at 106°C.
U. V. Spectrum (ethanol):

| | |
|---|---|
| Max. at 216–217 mμ | ϵ=4,600 |
| Max. at 235 mμ | ϵ=4,500 |
| Max. at 301–302 mμ | ϵ=18,050 |

As far as is known, this compound is not described in the literature.

STEP H: 7α, 17α-dimethyl-13β-ethyl-Δ$^{4,9,11}$-gonatriene-17β-ol-3-one 1.6 gm of 7α, 17α-dimethyl-13β-ethyl-Δ$^{4,9}$-gonadiene-11β, 17β-diol-3-one were dissolved under a nitrogen atmosphere in a mixture of 32 cc of methylene chloride (pure except for methanol) and 6.5 cc of acetonitrile and then 1.34 cc of an aqueous solution of 55° Be' perchloric acid were added thereto. The mixture was stirred for 2 minutes at room temperature, and then was poured rapidly into a water-ice mixture. The aqueous phase was extracted with methylene chloride and the methylene chloride extracts were washed with an aqueous sodium bicarbonate solution, then with water, dried and concentrated to dryness. The residue was dissolved in methylene chloride and the solution was passed through an alumina column and concentrated to dryness. The resulting dried extract was crystallized from a 1-1 mixture of isopropyl ether-methanol to obtain 1.025 gm of 7α, 17α-dimethyl-13β-ethyl-Δ$^{4,9,11}$-gonatriene-17β-ol-3-one melting at 185°C.

and having a specific rotation $[\alpha]_D = -142°$. ($c = 0.75$ percent in chloroform).

U. V. Spectrum (ethanol):

Max. at 240–241 mµ     ε=5,750
Max. at 269–270 mµ     ε=3,800
Max. at 282 mµ     ε=4,200
Max. at 344 mµ     ε=29,250

RMN Spectrum (deuterochloroform):

Peaks at 43–49.5 hz (hydrogens of 7-methyl); at 53–60.3–hz (hydrogens of 13-ethyl); at 76.3 hz (hydrogens of 17α-methyl); at 347 hz (hydrogen at four position); and at 374–384.2–392 hz (hydrogens at 11 and 12).

As far as is known, this compound is not described in the literature.

Various modifications of the products and process of the invention may be made without departing from the spirit or scope thereof and it is to be understood that the invention is to be limited only as defined in the appended claims.

We claim:

1. A process for the preparation of a 7α-methyl-Δ$^{4,9,11}$-gonatriene of the formula

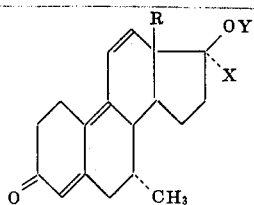

wherein R is lower alkyl of one to four carbon atoms, X is saturated or unsaturated straight or branched aliphatic hydrocarbon of one to four carbon atoms optionally substituted with chlorine and Y is selected from the group consisting of hydrogen and acyl of an organic carboxylic acid of one to 18 carbon atoms, comprising reacting a 7α-methyl-Δ$^4$-gonene of the formula

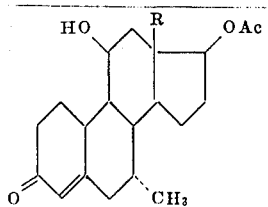

wherein R has the above definition and Ac is acyl of an organic carboxylic acid with a dehydrating agent selected from the group consisting of N-bromoacetamide, thionyl chloride and phosphorus oxychloride to form a mixture of dehydrated products, reacting the said mixture in acid media with a ketalization agent capable of forming a cyclic ketal to form a compound of the formula

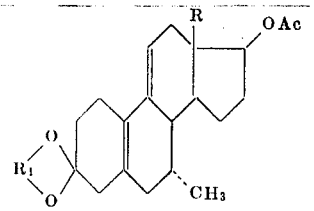

wherein R$^1$ is an alkylene, saponifying the latter with a basic agent to form a compound of the formula

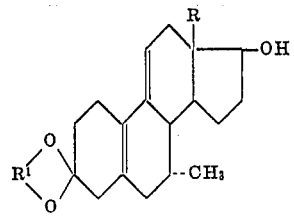

subjecting the latter to the action of an Oppenhauer oxidizing agent to form a compound of the formula

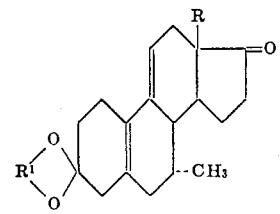

reacting the latter with an organo metallic derivative selected from the group consisting of organo lithium and organo magnesium halide to obtain a compound of the formula

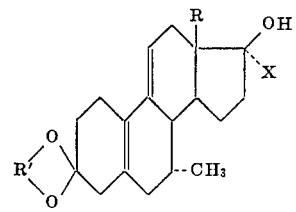

wherein X has the above definition, esterifying, if desired the said compound to form the corresponding 17β-OY compound, hydrolyzing the latter compound in an acidic media to form a compound of the formula

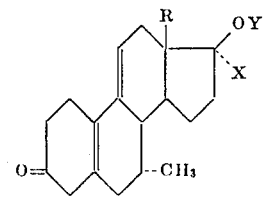

oxidizing the latter with oxygen in the presence of a tertiary amine to form a compound of the formula

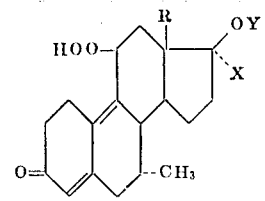

subjecting the latter to the action of a reducing agent selected from the group consisting of trimethyl phosphite, triethyl phosphite and alkali metal iodides to form a compound of the formula

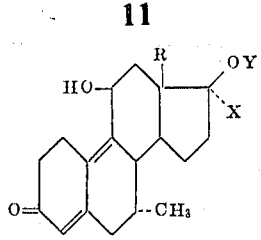

reacting the latter with an acid selected from the group consisting of a strong mineral acid, a Lewis acid and an organic acid in an aprotic solvent in the presence of a nucleophilic agent selected from the group consisting of organic acid nitrile and alkali metal cyanide to obtain the desired 7α methyl-$\Delta^{4,9,11}$-gonatriene.

2. The process of claim 1 wherein the dehydrating agent is N-bromo-acetamide in the presence of sulfurous acid anhydride.

3. The process of claim 1 wherein the ketalization agent is selected from the group consisting of ethylene glycol and 2-methyl-2-ethyl-dioxolane.

4. The process of claim 1 wherein the acid used to form the $\Delta^{4,9,11}$-gonatriene is selected from the group consisting of perchloric acid, sulfuric acid, formic acid, P-toluene sulfonic acid and boron trifluoride.

* * * * *